F. G. RANK.
NUT LOCK.
APPLICATION FILED OCT. 30, 1908.
973,460.
Patented Oct. 18, 1910.
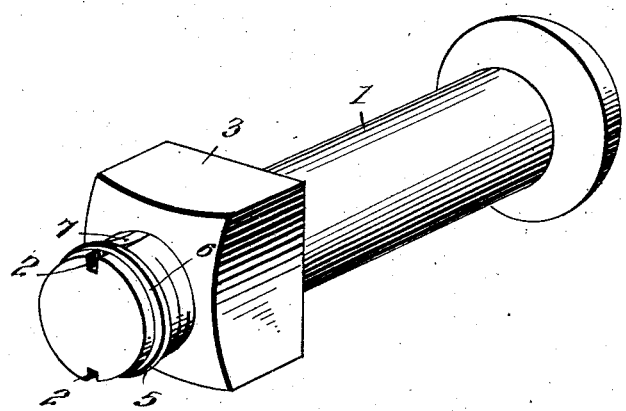
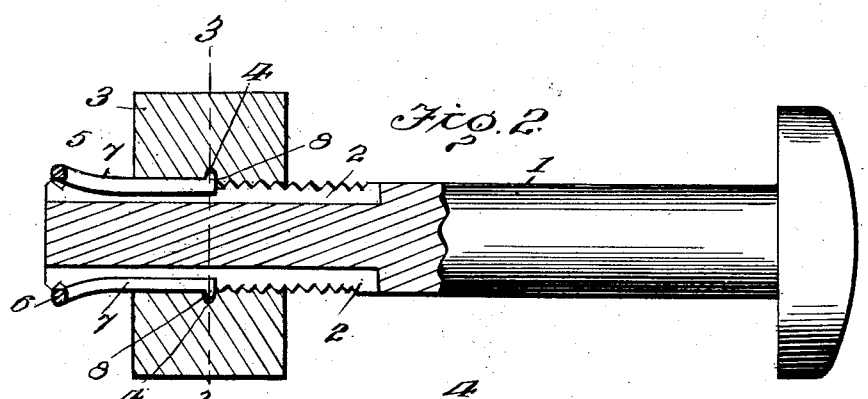
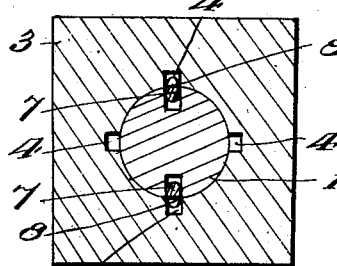
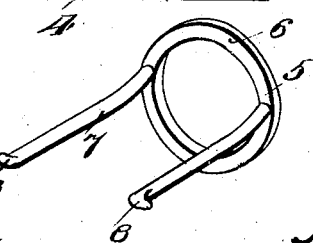
Inventor
F. G. Rank.
Witnesses
Attorneys

UNITED STATES PATENT OFFICE.

FREDERICK G. RANK, OF HERSHEY, PENNSYLVANIA.

NUT-LOCK.

973,460.

Specification of Letters Patent.    Patented Oct. 18, 1910.

Application filed October 30, 1908.   Serial No. 460,284.

*To all whom it may concern:*

Be it known that I, FREDERICK G. RANK, citizen of the United States, residing at Hershey, in the county of Dauphin and State of Pennsylvania, have invented certain new and useful Improvements in Nut-Locks, of which the following is a specification.

This invention comprehends certain new and useful improvements in nut locks, and the invention has for its object a simple, durable and efficient construction of device of this character which affords means for effectually maintaining the nut in the desired adjusted position against any loosening movement from vibration or the like; which renders the nut capable of being conveniently turned to effect a new adjustment thereof, by applying sufficient positive force to the nut, as through the instrumentality of a wrench, and which also permits the nut to be entirely removed with expedition, and without the danger of injuring the parts of the nut lock, as would prevent its reuse.

With this and other objects in view that will more fully appear as the description proceeds, the invention consists in certain constructions and arrangements of the parts that I shall hereinafter fully describe and then point out the novel features thereof, in the appended claim.

For a full understanding of the invention and the merits thereof, and to acquire a knowledge of the details of construction, reference is to be had to the following description and accompanying drawing, in which:

Figure 1 is a perspective view illustrating the application of my improved nut lock; Fig. 2 is a longitudinal section thereof; Fig. 3 is a transverse section, the section being taken on the line 3—3 of Fig. 2; and, Fig. 4 is a detail perspective view of the keeper.

Corresponding and like parts are referred to in the following description, and indicated in all the views of the drawing by the same reference characters.

A nut lock embodying the improvements of my invention, is designed to be applied to a threaded element 1 which, in the present instance, is in the form of a bolt, although not necessarily so, and which is formed in its periphery at substantially diametrically opposite points with longitudinally disposed grooves or keyways 2. Working upon this threaded element is a nut 3 which may be of the usual or any desired or approved construction or design, except that it is formed in its threaded inner surface with a series of sockets 4. These sockets are arranged in pairs, with the respective sockets of each pair located at diametrically opposite points, the number of pairs of sockets being varied according to the accuracy of adjustment which it is desired to effect in the nut lock, although in the present instance, only two of such pairs are provided, and they are deemed sufficient in most cases, since they permit the nut to be locked in adjusted position at every quarter turn, in a manner hereinafter disclosed. As the preferred means for securing the nut upon the threaded element, I provide a keeper 5 which comprises a collar 6 and longitudinally disposed spring keys or arms 7 that are secured to the collar at substantially diametrically opposite points, as shown, the collar being designed to loosely encircle the threaded element, and the keys being accommodated in the respective keyways 2. These keys 7 terminate in out-turned lugs 8 which, when the keys are in their normal positions, or uncompressed, are projected beyond the periphery of the threaded element and are designed to snap into the corresponding sockets 4. The keys are less in thickness than the depth of the grooves, so as to be susceptible of yielding inwardly under pressure while the out-turned lugs 8 are beveled on opposite sides, as clearly illustrated in Fig. 3 in order to be automatically retracted from the sockets by and upon the application of positive turning force to the nut.

In the practical use of my improved nut lock, the keeper is applied to the threaded element, as before described, and the out-turned lugs 8 are seated in corresponding sockets 4 in the nut, to hold the same in adjusted position against any loosening movement from vibration or the like. If occasion should demand that a new adjustment of the nut be effected, the latter is turned by sufficient positive force being applied thereto, as by means of a wrench, and such turning movement obviously presses the lugs 8 inwardly out of engagement with the sockets and effects the retraction of the lugs into the grooves 2 against the force of the spring keys 7. The lugs are retained in such inoperative or retracted position until another pair of sockets have been brought into registry therewith, which in the present instance, would be by a quarter turn of the nut, whereupon the spring keys would be released and the lugs would be projected outwardly beyond the periphery of the threaded element, and snap into engagement with such sockets.

From the foregoing description, in connection with the accompanying drawing, it will be apparent that I have provided an improved nut lock which is arranged to hold the nut against any accidental loosening movement, and at the same time permits the nut to be conveniently turned when desired, to effect a new adjustment thereof, or its removal from the threaded element; which embodies to a marked degree, the characteristics of simplicity, durability and efficiency of construction and operation, and which consists of comparatively few parts that may be easily and cheaply manufactured and readily assembled.

It is to be understood that I do not limit myself to forming the keys integral with the collar, but, if found more desirable in practice, I may form them separate from the collar, and rigidly secure them thereto in any suitable manner.

Having thus described the invention, what I claim is:

In a nut lock, the combination of a threaded element formed in its periphery with substantially diametrically opposite longitudinal keyways, a nut working on the threaded element and formed in its inner surface with substantially diametrically opposite sockets registering with the keyways, and a keeper consisting of a collar independent of the nut and fitting snugly around the periphery of the threaded element and movable longitudinally thereon, and spring keys secured to the annular collar at substantially diametrically opposite points and extending angularly on one side of the plane thereof and received in the respective keyways, the keys projecting within the nut and having their extremities out-turned and arranged to snap into the adjacent sockets to hold the nut against accidental turning movement, the keys being yieldable inwardly in the keyways and the out-turned ends being beveled on opposite sides whereby to be automatically retracted from the sockets by and upon the application of positive turning force to the nut.

In testimony whereof I affix my signature in presence of two witnesses.

FRED. G. RANK. [L. S.]

Witnesses:
HARRY J. MATHEOT,
EDWARD L. BURNETT.